United States Patent
Cuckrovani

[11] Patent Number: 6,135,185
[45] Date of Patent: Oct. 24, 2000

[54] TIRE CHANGING DEVICE

[76] Inventor: Mike Cuckrovani, 866 Main Street East, Hamilton, ON, Canada, L8M 1L9

[21] Appl. No.: 08/996,769

[22] Filed: Dec. 23, 1997

Related U.S. Application Data

[60] Provisional application No. 60/033,922, Dec. 26, 1996.

[51] Int. Cl.⁷ ................................................ B60C 25/132
[52] U.S. Cl. ............................ 157/1.17; 157/1.3; 157/14
[58] Field of Search ............................... 157/1.17, 1.22, 157/1.3, 21, 14

[56] References Cited

U.S. PATENT DOCUMENTS

| | | | |
|---|---|---|---|
| 2,563,987 | 8/1951 | Colley | 157/1.17 |
| 3,029,861 | 4/1962 | Gambardella | 157/1.22 |
| 3,056,449 | 10/1962 | Foster | 157/1.22 |
| 3,100,011 | 8/1963 | Lydle | 157/1.22 |
| 3,707,179 | 12/1972 | Le Pier | 157/1.17 |
| 3,717,192 | 2/1973 | Hoover et al. | 157/1.3 X |
| 4,061,173 | 12/1977 | Daly et al. | |
| 4,133,363 | 1/1979 | Gardner | 157/1.3 |
| 4,245,686 | 1/1981 | Holladay et al. | |
| 4,461,335 | 7/1984 | Beemer | 157/1.22 |
| 4,846,239 | 7/1989 | Heller et al. | 157/1.3 |
| 4,947,918 | 8/1990 | Unrau | |
| 5,078,193 | 1/1992 | Badelt et al. | |
| 5,332,020 | 7/1994 | Brunner | 157/14 |
| 5,337,817 | 8/1994 | Steinbeck et al. | 157/21 |
| 5,806,578 | 9/1998 | Gonzaga | 157/1.3 |

*Primary Examiner*—James G. Smith

[57] ABSTRACT

A tire changing device for mounting and dismounting tires from wheel rims having a rod, and a base with a working surface for placement of wheel rims thereon. The rod is attached to the base such that the rod is disposed substantially perpendicular to the working surface. The tire changing device also has a bracket for engaging with the rod, such that a wheel can be clamped and held interposed between the bracket and the working surface. The base of the tire changing device is rigidly held in place by clamping in vice jaws or affixing to a work bench.

14 Claims, 4 Drawing Sheets

TIRE CHANGING DEVICE

CROSS REFERENCE TO RELATED APPLICATION

This Application claims priority from prior U.S. Provisional Application Ser. No. 60/033,922 filed Dec. 26, 1996.

FIELD OF THE INVENTION

This invention relates generally to tire changing machines and in particular relates to tire changing devices for small diameter tires such as golf cart, trailer and wheelbarrow wheels.

BACKGROUND OF THE INVENTION

Automated hydraulic, pneumatic and/or electric tire changing devices have been on the market for some time for changing tires of large diameter wheels found on passenger cars, trucks or larger vehicles. These relatively large, expensive, automatic tire changing devices are normally located in automotive or truck repair garages and/or specialty tire shops where there is a requirement for the frequent changing of tires off and on wheel rims.

The large automated tire changing devices are not suited or designed to change smaller diameter tires which are found on, for example, golf carts, trailers or wheelbarrows. In the past, these tire have been changed, usually by hand, and/or with homemade devices and customarily have been changed on the floor by holding down the tire with the operator's knees. The manual mounting and dismounting of small diameter tires on and off wheel rims in this manner is a time consuming, labourious and often a dangerous task. Tires having tight beads are especially susceptible to problems because on changing the tire on the rim, the operator may make a nick the tire bead or lip of the wheel with the resulting weakness causing the tire to explode on re-inflation. Furthermore, if the rim is not securely fastened down the explosion may cause serious injury to the operator.

Recently there has been an increase in vehicles with smaller diameter wheels such as golf carts, all terrain vehicles, trailers and wheelbarrows. However the volume of changing small diameter tires often does not justify installing expensive permanent equipment which takes up a lot of shop space. Therefore, devices have been brought onto the market which have tried to address the concerns and the problems encountered with changing small diameter tires.

For example prior art U.S. Pat. No. 5,332,020 by Brunner dated Jul. 26, 1994 and U.S. Pat. No. 5,078,193 by Badelt dated Jan. 7, 1992 are two devices which have tried to address the problems with changing small diameter tires. Both devices are manually operated tire stands which are adapted to clamp smaller diameter tires in a device for mounting and dismounting tires off and on wheel rims.

The Badelt device U.S. Pat. No. 5,078,193, uses a complicated set or adaptor plates in order to accommodate various rim configurations and bolt hole spacings within the wheel rim. This device can be used in conjunction with a large automated tire changer or can be bolted to a work bench. This prior art device can only accommodate a limited number of wheel rim configurations and wheel rim bolt patterns as defined by the adaptor plates which are shipped with the apparatus and also cannot easily be setup and taken down when not required unless used in conjunction with a large automated machine.

The Brunner device, U.S. Pat. No. 5,332,020 is permanently installed under the surface of a work bench and has a complicated mechanism for raising and lowering a threaded rod from below to above the work bench surface in order to bring the device into a useable position. Furthermore, in order to install the Brunner device, a permanent hole must be bored into the surface of a work bench which may interfere in subsequent use of the work bench. The Brunner device is designed to be used in the one location where it is permanently installed and cannot be easily removed, transported and relocated to other places within the shop or in the field for use there. The Brunner device also does not address the issue of bead breaking.

Accordingly there is a need for a tire changing device which addresses the above-mentioned problems, which is simply constructed and simple to operate and is safe and easy to use by an operator. As well, the device should take up little room, be easily put into a working position and stowed away for future use when small tires need to be changed. The device should be easily transportable and set up in other locations if required.

SUMMARY OF THE INVENTION

According to one aspect of the present invention a tire changing device for mounting and dismounting tires comprises from wheel rims, comprises a rod attached to a base with a working surface for placement of wheel rims thereon, the base having an attachment means for attaching the rod to the base such that the rod is disposed substantially perpendicular to the working surface. It also has a bracket means for engaging with the rod, such that a wheel can be clamped and held interposed between the bracket means and the working surface; and also a mounting means for rigidly holding the base in a stationary position.

According to another aspect of the present invention a tire changing device for mounting and dismounting tires from wheel rims comprises a threaded rod and a base with a working surface for placement of wheel rims thereon. The base has an attachment means for attaching the rod to the base such that the rod is disposed substantially perpendicular to the working surface. The tire changing device also has a wing nut for engaging with the threaded rod, such that a wheel can be clamped and held interposed between the wing nut and the working surface; and a mounting means for rigidly holding the base in a stationary position.

Preferably the attachment means comprises a threaded aperture defined in the base for receiving and engaging the threaded rod.

Preferably the mounting means comprises a clamping means for releasably engaging the base with vice jaws.

Preferably the clamping means comprises a U channel rigidly connected to a bottom surface of the base, dimensioned and adapted to be clamped in a vice for holding the base rigidly in place.

Preferably the working surface comprises a friction pad in surface engagement with the base such that a slip resistant working surface is provided.

Preferably the tire changing device further comprises a breaker means slidably engaging the threaded rod for breaking the bead of a tire off the wheel rim.

Preferably the breaker means comprises a bead breaker having a collar slidably engaging the threaded rod; and a top nut engaging with the threaded rod for adjusting the maximum height of the collar on the threaded rod.

Preferably the tire changing device further comprises a tire iron having a bar, a bar end and a bead remover end, for installing and removing a tire bead onto or off of a wheel rim, in the conventional manner.

BRIEF DESCRIPTION OF THE DRAWINGS

The invention will now be described by example only, with reference to the following drawings.

DETAILED DESCRIPTION OF THE PREFERRED EMBODIMENT

Figure 1:
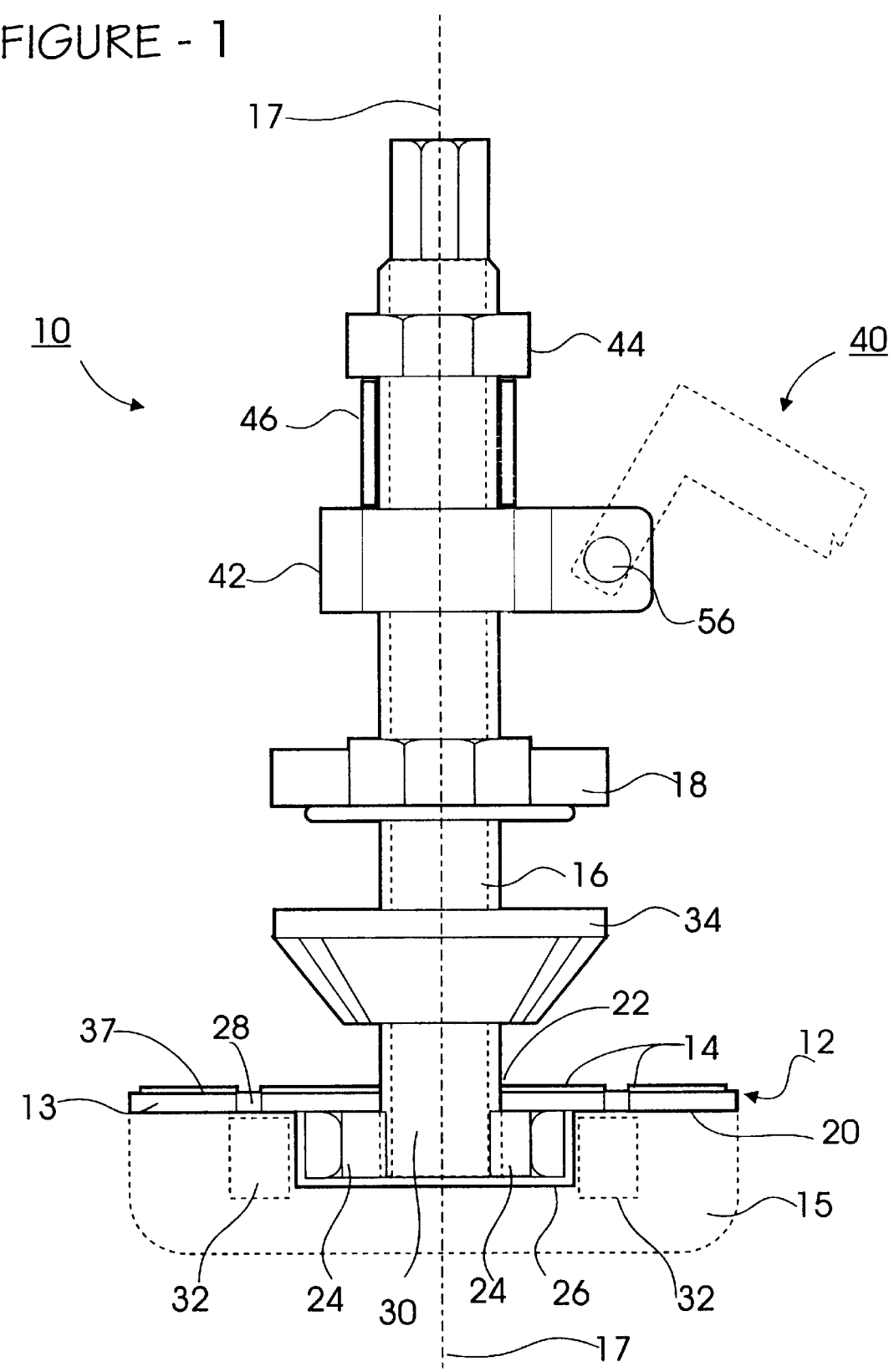
FIG. 1 is a schematic elevational partly cross sectional view of the tire changing device.

The present invention, a tire changing device, is shown generally as 10 and comprises a base shown generally as 12 having a top 13, flanges 15, a working surface 14, a threaded rod 16 and a wing nut 18.

Figure 4:
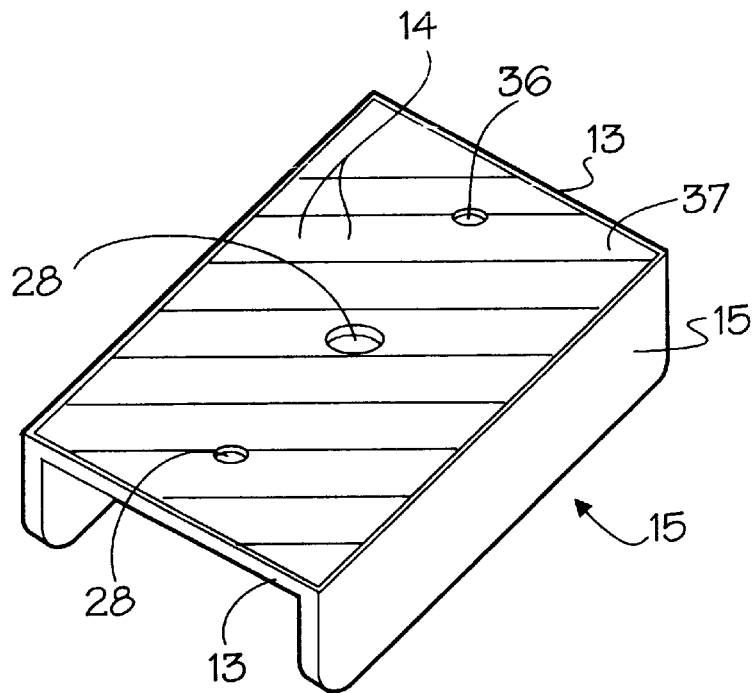
FIG. 4 is a plan view of the top of the base.
Figure 5:
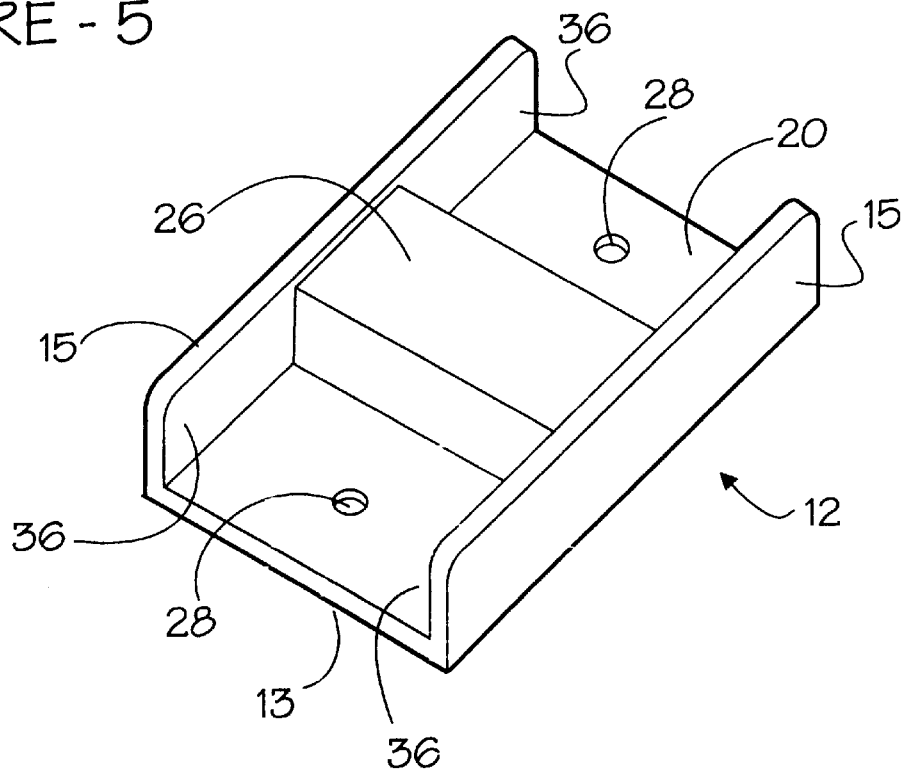
FIG. 5 is plan view of the bottom of the base.

Referring now to FIGS. 1, 4 and 5 the present invention, a tire changing device, shown generally as 10 comprises a rectangular shaped base 12 having a working surface 14, a bottom surface 20 and a centrally located base aperture 22. Top 13 has flanges 15 extending vertically downward from either side of base 12. Welded onto bottom surface 20 is a base nut 24 which is aligned concentrically with base aperture 22. U channel 26 is also welded to bottom surface 20 and to the interior sides 36 of flanges 15. U channel 26 is centrally positioned over base nut 24 and runs transversely across bottom surface 20 of base 12. Top 13 of base 12 also has mounting holes 28 defined therein, dimensioned to receive fasteners there through.

Base nut 24 is internally threaded and dimensioned to receive externally threaded rod 16 which is screwed into base nut 24 until bottom end 30 of threaded rod 16 makes contact with U channel 26. Base 12 can be clamped into vice jaws 32, shown in fathom lines, or can be securely mounted onto a bench top or other surface via fasteners screwed through mounting holes 28.

Tire changing device 10 preferably comprises a hub cone 34 for engaging with a wheel rim hub when wing nut 18 is tightened down over a wheel rim placed on working surface 14. Working surface 14 of base 12 is preferably covered with friction pad 37 for providing additional friction when mounting a wheel rim onto working surface 14 and preventing the wheel rim from sliding or spinning over working surface 14. Preferably, bead breaker collar 42 is slidably placed over threaded rod 16 and top nut 44 having internal threads dimensioned to engage with threaded rod 16 is screwed down over threaded rod 16. Top nut 44 provides an upper maximum vertical stop for bead breaker collar 42 thereby preventing collar 42 from sliding off the top of threaded rod 16. Optionally, spacer 46 which is adapted to slide over threaded rod 16, is interposed between bead breaker collar 42 and top nut 44 for providing additional spacing depending on the size of and the thickness of the wheel rims placed on working surface 14.

Figure 2:
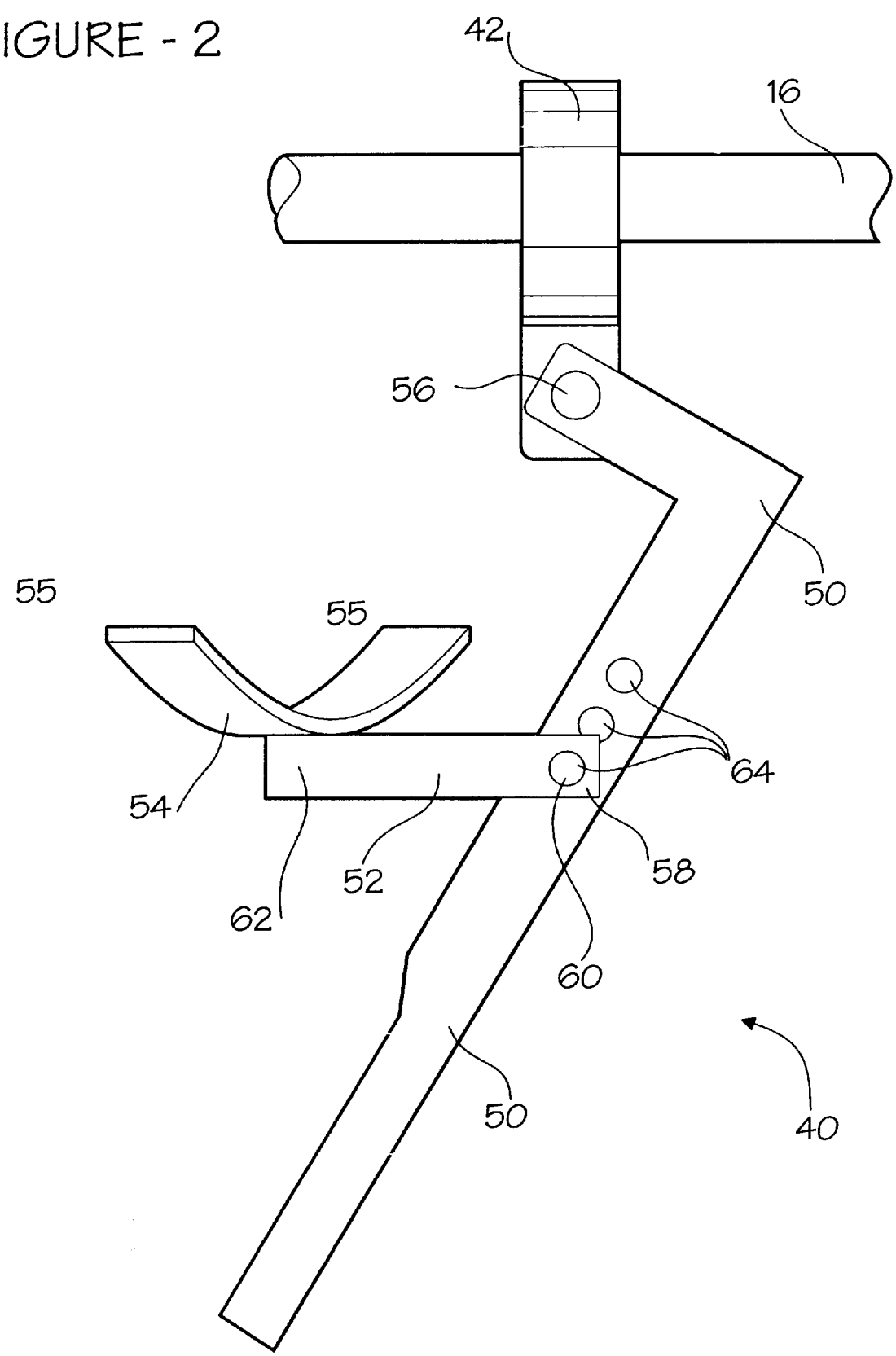
FIG. 2 is a schematic side perspective elevational view of the bead breaker.

Referring now to FIG. 2 depicting a bead breaker shown generally as 40 comprising a collar 42, handle 50, arm 52 and shoe 54. L shaped handle 50 is pivotally attached to collar 42 with connecting pin 56. Arm 52 is pivotally attached at arm top 58 with attaching pin 60 to handle 50. Shoe 54 is rigidly attached to arm bottom 62 and is oriented transversely to arm 52 and handle 50. Arm 52 can be mounted in any one of the attachment apertures 64, thereby accommodating a variety of wheel rim diameters.

Figure 3:
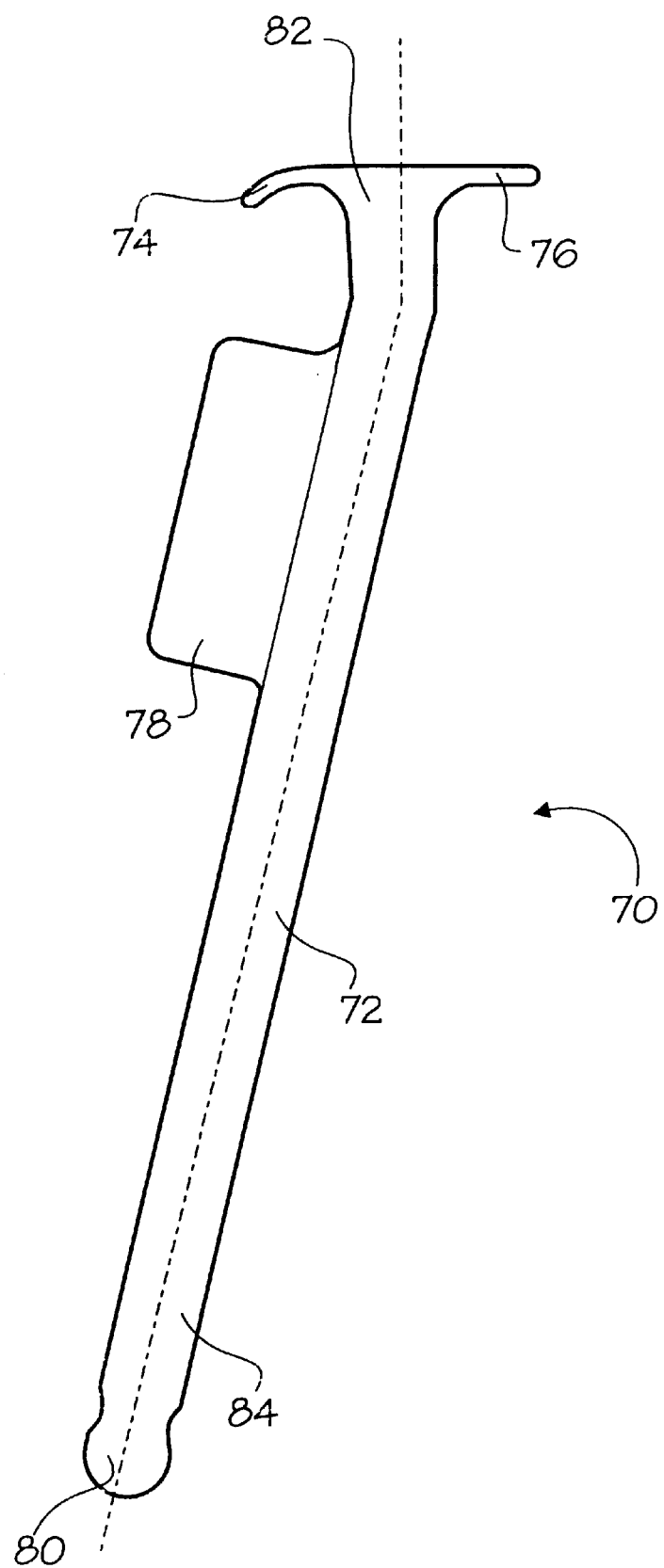
FIG. 3 is a schematic side elevational cross sectional view of the tire iron.

Referring now to FIG. 3 the tire changing device 10 further comprises a tire iron shown generally as 70 comprising bar 72, bead installer lip 74, bead guide 76, striker plate 78 and bead remover end 80. Bead installer lip 74 is integrally connected to and extends transversely from bar end 82. Bead guide 76 is integrally connected to and extends transversely from bar end 82 of bar 72 and is disposed opposite bead installer lip 74. Bar 72 is bent slightly downwardly at bar end 82. Striker plate 78 is rigidly attached to bar 72 near bar end 82. Bar remover end 80 is rounded and smooth and has rim groove 84 proximate bead remover end 80.

In use, base 12 can be permanently installed using mounting holes 28 onto a working surface such as a bench top. Alternatively, base 12 can be temporarily mounted onto a suitable bench vice by clamping vice jaws 32 onto the sides of U channel 26 as depicted. Once the base has been securely mounted threaded rod 16 is threaded into base nut 24 until bottom end 30 contacts U channel 26 thereby rigidly locking threaded rod 16 into base 12. In this installed position the longitudinal axis 17 of threaded rod 16 is oriented substantially perpendicular to working surface 14 of base 12.

A wheel rim with or without a tire attached can be placed on working surface 14 and threaded rod 16 can then be placed through the wheel hub of the wheel rim and threaded into base nut 24. Alternatively, threaded rod 16 can be threaded into base nut 24 first and then a wheel rim with or without a tire attached can be placed over threaded rod 16 and laid down on its side onto working surface 14. Wing nut 18 is then screwed down over threaded rod 16 until making contact with the hub of a wheel rim placed on working surfaced 14 thereby clamping the wheel rim between wing nut 18 and working surface 14. Depending on the type of wheel rim that is mounted in tire changing device 10, a hub cone 34 may be slid down over threaded rod 16 prior to installing wing nut 18 in order for hub cone 34 to engage with the hub of a wheel rim. This helps to centre the wheel rim on threaded rod 16 and make better contact with the wheel rim hub.

Preferably, with wing nut 18 in place, bead breaker collar 42 of bead breaker 40 is slid over threaded rod 16 and thereafter top nut 44 is screwed down over threaded rod 16 thereby preventing bead breaker collar 42 from slipping off the top of threaded rod 16. Optionally for narrow wheel rims, spacer 46 may be slid down over threaded rod 16 prior to installing top nut 44 in order to lower the maximum height that bead breaker collar 42 can slide up threaded rod 16.

For dismounting a tire, contact edge 55 on the bottom side of shoe 54 is brought in contact with the side wall of the tire to be dismounted. Handle 50 is urged downwardly such that contact edge 55 separates the tire bead from the tire rim thereby breaking the bead. Depending on the diameter of the tire to be dismounted, arm 52 can be selectively attached to one of three attachment apertures 64 in order to insure that contact edge 55 makes contact with the tire side wall as near as possible the wheel rim.

Once the bead is broken, bead remover end 80 of tire iron 70 is placed on the tire bead with rim groove 84 resting on the wheel rim outer diameter. Bead remover end 80 is then slid around the outer diameter of the wheel rim by pivoting tire iron 70 about threaded rod 16 until the bead is completely disengaged from the wheel rim. To install a tire on a wheel rim, bead installer lip 74 engages a tire bead while bead installer lip 74 is rotated around the outer diameter of the wheel rim by pivoting tire iron 70 about threaded rod 16, until the bead is completely installed onto the wheel rim.

Striker plate 78 of tire iron 70 makes contact with threaded rod 16 while tire iron 70 is pivoting about threaded rod 16.

The size and shape of base 12 is not critical and it will be apparent that it could be square, round or any other shape. The current shape is chosen for ease and cost of manufacturing. Threaded rod 16 preferably has a heavy duty acme thread to minimize damage to the thread when using tire iron 70.

Threaded road 16 may also be a non-threaded rod having teeth for example or may even be smooth.

If threaded rod 16 is smooth or not threaded wing nut 18 and top nut 44 would have to be suitably adapted to engage with rod 16. Threaded rod 16 may also be permanently attached to base 12 by welding for example.

It will be apparent to those skilled in the art that various modifications with adaptations can be made without departing from the spirit of the invention, the scope of which is defined in the appended claims.

I claim:

1. A portable tire changing device for holding a tire and for mounting and dismounting tires from wheel rims, comprising:
   a) a threaded rod;
   b) a base with a working surface for placement of wheel rims thereon, the base having an attachment means for attaching the rod to the base such that the rod is disposed substantially perpendicular to the working surface;
   c) a wing nut for engaging with the threaded rod, such that a wheel can be clamped and held interposed between the wing nut and the working surface;
   d) a U channel for holding the base in a stationary position, said U channel rigidly connected to a bottom surface of the base, dimensioned and adapted to be clamped in a vice for temporarily and releasably holding the base rigidly in place;
   e) a breaker means slidably engaging the rod for breaking the bead of a tire off the wheel rim; and
   f) a tire iron for use with said base and rod having a bar, a bar end and a bead remover end, for installing and removing a tire bead onto or off of a wheel rim, in the conventional manner.

2. The tire changing device claimed in claim 1, further comprises a hub cone slidably mounted on the rod between the working surface and the wing nut, for engaging the hub of a wheel placed on the working surface.

3. The tire changing device claimed in claim 1, wherein the breaker means comprises:
   a) a bead breaker having a collar slidably engaging the threaded rod for attaching the bead breaker to the threaded rod; and
   b) a top nut threadably engaging with the threaded rod for adjusting the maximum height of the collar on the threaded rod.

4. The tire changing device claimed in claim 3, wherein the bead breaker further comprises:
   a) a handle pivotally mounted to the collar via a connecting pin for applying force on the bead breaker;
   b) an arm pivotally mounted to the handle at an arm top via an attaching pin; and
   c) a curved shoe integrally and rigidly connected to an arm bottom for engaging with and applying downward pressure on a tire wall thereby breaking the bead of a tire off the wheel rim.

5. The tire changing device claimed in claim 3, wherein the breaker means further comprises a spacer interposed between the collar and top nut and sidably engaging the threaded rod, such that the spacer limits the maximum height of the collar on the rod.

6. The tire changing device claimed in claim 1, wherein the tire iron comprises a bead installer lip integrally connected to and extending transversely from a bar end of the tire iron.

7. The tire changing device claimed in claim 6, wherein the tire iron comprises a bead guide integrally connected to an extending transversely from the bar end of the tire iron such that the bead guide and bead installer lip form a T-shaped bead end.

8. The tire changing device claimed in claim 1, wherein the bead remover end is a rounded ball shaped end with a circumferential rim groove around the bar for removing a tire bead in a conventional manner.

9. The tire changing device claimed in claim 1 wherein the attachment means releasably attaches the rod to the base such that the tire changing device can be temporarily set up and easily collapsed in any location having a suitable vice.

10. The tire changing device claimed in claim 9 wherein the attachment means further comprises a threaded aperture defined in the base for temporarily and releasably receiving and engaging the threaded rod.

11. The tire changing device claimed in claim 10 wherein the attachment means further comprises a base nut rigidly secured to the base for temporarily and releasably receiving and engaging with the threaded rod.

12. The tire changing device claimed in claim 11 wherein said base nut is disposed within said U channel such that said threaded rod threads through said base nut until said rod makes contact with said U channel thereby temporarily locking said rod in position.

13. The tire changing device claimed in claim 12 wherein the base further comprises a planar top and flanges extending vertically downward from either side of said base forming a U section, and said clamping means comprising a U channel disposed transversely across said bottom surface of said base and rigidly connected to said bottom surface and also rigidly connected to said flanges, such that said base and said clamping means together comprise said U channel disposed transversely to and nested within said U section of said base in order to facilitate clamping of said base in vice jaws and prevent rotation of said base.

14. The tire changing device claimed in claim 1, wherein the attachment means releasably attaches the rod to the base such that the tire changing device can be temporarily set up and easily collapsed in any location having a suitable vice and further the mounting means comprising a plurality of apertures defined in the base for receiving fasteners there through for permanently fasting the base to a rigid surface such that the base can be permanently or temporarily setup.

* * * * *